United States Patent
Morano

(10) Patent No.: US 6,476,642 B1
(45) Date of Patent: Nov. 5, 2002

(54) DIFFERENTIAL CURRENT DRIVER CIRCUIT

(75) Inventor: David A. D. Morano, Malden, MA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/617,706

(22) Filed: Jul. 17, 2000

(51) Int. Cl.[7] .......................................... H03K 19/0175
(52) U.S. Cl. ............................................. 326/86; 326/68
(58) Field of Search ................................ 326/86, 82–83, 326/87, 66, 68, 73

(56) References Cited

U.S. PATENT DOCUMENTS

| | | | |
|---|---|---|---|
| 4,890,010 A | | 12/1989 | Neudeck et al. |
| 5,430,396 A | * | 7/1995 | Morano .................. 326/90 |
| 5,450,026 A | | 9/1995 | Morano |
| 6,008,665 A | * | 12/1999 | Kalb et al. ............... 326/30 |
| 6,111,431 A | * | 8/2000 | Estrada ................... 326/83 |

* cited by examiner

Primary Examiner—Michael Tokar
Assistant Examiner—James H Cho
(74) Attorney, Agent, or Firm—Ryan, Mason & Lewis, LLP

(57) ABSTRACT

An improved differential current driver circuit of the invention provides techniques for programming a bus termination voltage and an output non-zero absolute current value of the driver circuit. This information is used by the driver circuit to closely match the internal elements of the circuit so as to produce two very stable (over temperature and IC processing) complementary output currents. The improved circuit also employs active feedback mechanisms to ensure a close match of the two complementary output currents. This may be done using a novel balanced bridge circuit in the output stage of the current generation portion of the driver circuit.

43 Claims, 7 Drawing Sheets

DIFFERENTIAL CURRENT DRIVER CIRCUIT

FIELD OF THE INVENTION

The invention relates to differential current driver circuits and, more particularly, to improved differential current driver circuits for use in accordance with data busses.

BACKGROUND OF THE INVENTION

The need for high speed busses that meet both packet data communications and telecommunications requirements is an important current area of research in electronic switching systems. Systems that can integrate these different types of data cost effectively have an advantage in the market place. Few existing switching systems have even come close to providing cost effective integrated transport (let alone switching) of these types of data. One means of achieving a cost effective switching system for both telecommunications and packet data switching is the use of a synchronous bus. Early synchronous busses suffered from high cross-talk on their signals and therefore newer bus designs have resorted to the use of differential signal paths.

Most differential signal systems are implemented with a logic family known as Emitter Coupled Logic (ECL). These systems were unable to scale to high data rates (above 100 mega-transfers per second) due to a variety of problems. Some of the problems with existing differential switching backplanes based on ECL include: (i) the use of ECL gives rise to a lower backplane impedance due to low driver output impedance; (ii) the use of ECL does not provide any sort of wired-OR function on the backplane for functions such as arbitration; (iii) the use of ECL gives rise to spurious wave propagations when going into high impedance (bus isolation) mode; and (iv) the use of ECL gives rise to an unbalanced wave propagation when going into its signal drive mode from high impedance.

These and other problems necessitated the invention of new differential signal driver logic. Such differential signal driver logic is described in U.S Pat. No. 5,430,396, issued to D. A. Morano on Jul. 4, 1995 and entitled "Backplane Bus for Differential Signals," and in U.S. Pat. No. 5,450,026, issued to D. A. Morano on Sep. 12, 1995 and entitled "Current Mode Driver for Differential Bus," the disclosures of which are incorporated by reference herein. Such differential signal driver logic is generally referred to as $D^2L$ or Dave's Differential Logic (after the inventor of the previous patents and the present invention).

Particularly, U.S Pat. No. 5,430,396 discloses a differential voltage bus system wherein the two leads of the bus are biased by the termination networks with a predetermined voltage difference representing a digital signal of one binary type. The bus driver in each bus master connects a current source to one of the two bus leads and a current sink to the other of the two bus leads in response to an input digital signal of the other binary type thereby changing the voltage difference on the bus to represent the other binary type. In response to an input digital signal of the first-mentioned binary type, the bus driver isolates the current source and sink from the bus and connects them together in order to decrease the detrimental effect of transients. The selective switching in the bus driver is performed by MOSFET (metal oxide semiconductor field effect transistors) switches that are driven by buffer driver circuits each of which uses a combination of MOSFETs and an NPN transistor to drive its respective MOSFET switch with a high peak current thereby enabling rapid switching. The current source and sink in the bus driver also uses a combination of MOSFETs and NPN transistors in order to permit operation of the bus at low voltage levels.

U.S. Pat. No. 5,450,026 discloses a current mode bus driver which couples input digital signals to a bus which is normally biased with a voltage difference representing one binary type. The current mode bus driver responds to input digital signals of the other binary type by connecting a current source to one lead of the bus and a current sink to the other lead of the bus, thereby driving the bus to a voltage difference which represents the other binary type. In response to input digital signals of the first-mentioned binary type, the bus driver isolates the current source and current sink from the bus and connects the current source directly to the current sink. The selective switching is performed by n-channel MOSFETs that are driven by the input digital signals through unique buffer driver circuits employing a CMOS (complementary metal oxide semiconductor) inverter, an n-channel MOSFET and an NPN transistor. A combination of MOSFETs and NPN transistors provide a current source and sink that permit operation of the bus at very low voltage levels.

Such interface logic solves a number of problems related particularly to high speed busses for telecommunications applications. An ideal representation of what a $D^2L$ driver circuit must emulate is shown in FIG. 1A. Specifically, FIG. 1A shows the basic idea involved in $D^2L$ bus driving technology. As can be seen in the figure, it is basically a controlled current source 10 with two output states whose value can be switched from an input (not shown) to the driver. The two output current values are zero Amperes and some other non-zero value. Most circuits to date have used the value of 10 milliAmperes and the currently described circuit preferably does also. This is the most used non-zero output current used so far in applications.

Ideally, the output impedance approaches infinity but any output impedance that is sufficiently larger than the bus characteristic impedance is quite useful. Of course, the higher the output impedance is, the better the performance of the circuit. Practical $D^2L$ circuits to date still have a lower output impedance than might be desirable but, as will be explained herein, the circuit of the present invention has an improved output impedance, i.e., higher output impedance.

Referring to FIG. 1B, the use of $D^2L$ driver circuitry in one of its major applications is shown. A bidirectional bus 10 is shown with two bus masters (Bus Master 1 and Bus Master 2). Terminations 16 are shown on each end of the bidirectional bus 10. Each bus master is composed of a $D^2L$ driver circuit and a corresponding receiver circuit. The receiver circuit is any differential receiver suited to the $D_2L$ signal characteristics on the bus. As shown, Bus Master 1 includes a $D^2L$ driver circuit 12-1 and a receiver circuit 14-1, while Bus Master 2 includes a $D^2L$ driver circuit 12-2 and a receiver circuit 14-2. Each $D^2L$ driver circuit takes as its primary input a binary signal, e.g., a CMOS (complementary metal oxide semiconductor) input, and produces on its output two signals that are connected to the two leads of the bus (BUS+ and BUS− as depicted in FIG. 1A). Each of the output signals may source equal but opposite currents in response to the binary input signal of one type and will not source any current in response to a binary signal of the other type. Multiple $D^2L$ drivers may also be used in parallel for each bus master with a corresponding bus of parallel pairs of leads.

Although the invention of early $D^2L$ systems solved many of the problems discussed previously, with regard to the use of ECL for example, most existing D²L drivers can be difficult to use because of poor electrical performance and poor temperature stability. An example of an existing integrated circuit (IC) that uses the D²L signaling system is the BLAST (Balanced Logic And Synchronous Transceiver) I integrated circuit. This was a BiCMOS design and suffered from the problems listed above.

Some of the problems with existing D²L drivers are: (i) there is not a precise enough balance between the high and low output currents; (ii) the high and low output currents vary with different bus termination voltages; (iii) the driver exhibits poor temperature stability over the full commercial temperature range; (iv) early cheap CMOS-only designs were unusable due to poor performance; (v) existing BiCMOS (bipolar CMOS) designs are costly due to the extra processing steps required for the inclusion of bipolar transistors in the integrated circuit; and (vi) existing designs did not provide the necessary operating output voltage range which was required in most practical systems.

Thus, there is a need for improved differential current driver circuits that overcome these and other limitations associated with existing differential current driver circuits.

SUMMARY OF THE INVENTION

This present invention provides a new differential current driver circuit that better satisfies the requirements for the use of D²L on backplane busses. This new driver circuit provides advantages over all existing D²L driver implementations, as well as other existing differential signal driver circuits. The new driver circuit provides both improved electrical performance over existing designs and lower manufacturing cost. These advantages make this new driver circuit attractive for the implementation of a whole new range of high speed products. Many possible products were either impossible or very difficult to implement with previous circuits.

More particularly, a differential current driver circuit for use in driving signals on a backplane bus comprises: (i) a current generation stage, the current generation stage providing two current sources, the two current sources respectively generating a first current signal and a second current signal, the first and second current signals being substantially equal in magnitude and opposite in polarity; and (ii) a current switching stage, the current switching stage being coupled to the current generation stage and switching the first and second current signals generated in the current generation stage between a first differential output state and a second differential output state in response to an input binary signal.

In a first aspect of the invention, the current generation stage is substantially functionally separate from the current switching stage. In a second aspect of the invention, active components of the current generation stage and the current switching stage are predominantly complementary metal oxide semiconductor (CMOS) components. In a third aspect of the invention, the magnitudes (absolute values) of the first and second current signals are programmable. In a fourth aspect of the invention, the current generation stage has active feedback control for setting the absolute values of the first and second current signals. In a fifth aspect of the invention, the current generation stage has active feedback control, responsive to an input voltage, for ensuring that the first and second current signals are substantially optimally generated with respect to a bus termination voltage associated with the backplane bus.

Furthermore, in preferred embodiments of the invention, two or more of these inventive aspects may be combined in a differential signal driver circuit. Also, in a preferred embodiment, the differential signal driver circuit of the invention is implemented as an integrated circuit (IC). However, the invention is not so limited.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENTS

1. New Driver Circuit

The following subsections provide a detailed description of the technology used in the design of the differential signal driver circuit of the present invention. The issue of achieving a more precise non-zero output current value is presented and discussed. Also, the means used to create better balance between the output current polarities along with how the driver outputs are matched to the external bus termination voltage is given in the following subsections. A more detailed description of the circuit's operation is provided later in the specification.

1.1 Circuit Processing Technology

In a preferred embodiment, the driver circuit is designed entirely in CMOS. A processing technology with feature size of 0.5 microns was used as the initial target for this design. Using all CMOS provides a cost advantage over existing BiCMOS designs. Further, this present design is really the first production usable all-CMOS design. Early CMOS designs had such poor performance that their use in any practical system was not possible. The use of BiCMOS was needed to create the first usable D²L drivers but its higher cost as compared to CMOS (about 20 to 25 percent) was not acceptable for many system cost points.

Although BiCMOS offers the hope for better electrical performance at high speeds, the early designs suffered from poor circuit architectures and were not able to use the performance available from BiCMOS. Although BICMOS also allows for the possible use of better temperature stability, this too was not realized in any previous circuits. In spite of the speed or timing advantages that might be possible using BiCMOS, the driver circuit of the invention is able to give both better electrical performance and better temperature stability than existing BiCMOS designs. This is all achieved while also taking advantage of the cost savings from being designed entirely in a standard all-CMOS IC technology.

This circuit also does not require (or use) any extra CMOS processing steps that have become popular lately. Similar circuits to the one described that have a large analog aspect to them often make use of, or require, extra processing steps in their manufacture. These extra processing steps can provide functions such as improved analog transistor characteristics. These additional processing steps, like in the case of BiCMOS, add cost to the final IC and are undesirable for this reason. Although these extra available processing steps (not enumerated here) can make certain circuit performance better for certain applications, these additional design opportunities are not required in the present circuit, thus resulting in a minimized manufacturing cost. Of course, such extra CMOS processing steps could be employed.

Figure 1A:
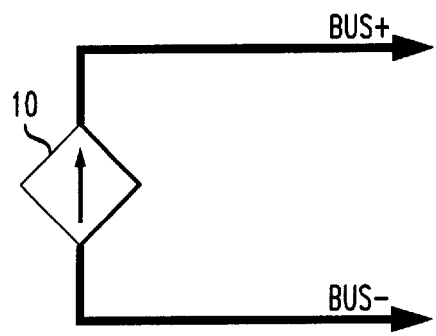
FIG. 1A is schematic diagram illustrating an ideal D²L driver circuit.
Figure 1B:
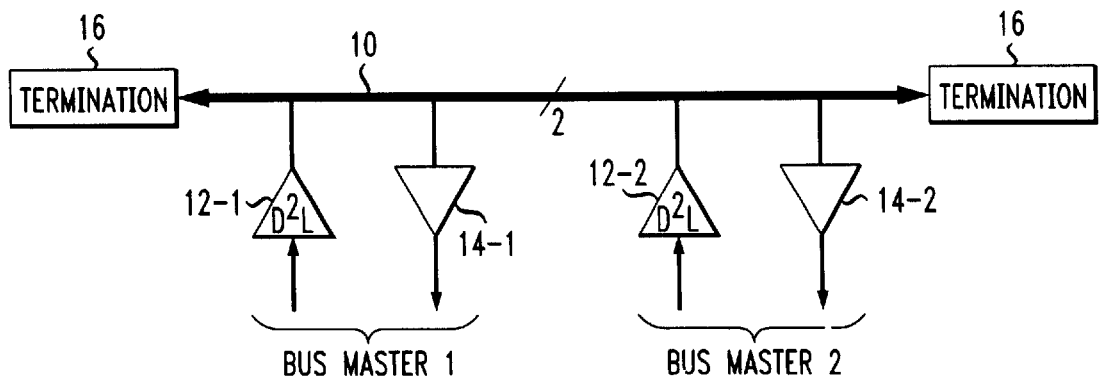
FIG. 1B is a schematic diagram illustrating the use of D²L driver circuitry in a bus application.
Figure 2A:
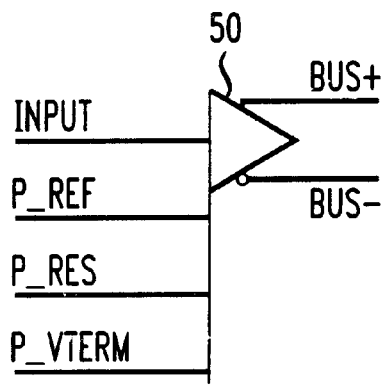
FIG. 2A is a schematic diagram illustrating the inputs and outputs associated with a driver circuit according to one embodiment of the present invention.

Referring initially to FIG. 2A, a schematic diagram is shown illustrating the inputs and outputs associated with a driver circuit 50 according to one embodiment of the present invention. It is to be appreciated that two or more such driver circuits 50 may be respectively used in place of the driver circuits 12-1 and 12-2 illustrated in the bus implementation of FIG. 1B. As shown, the driver circuit 50 receives as a primary input the signal labeled INPUT. As mentioned above in the context of FIG. 1B, this signal is a CMOS level binary input. The driver circuit 50 produces on its output two signals that, similar to the bus implementation context of FIG. 1B, may be connected to the two leads of the bus, BUS+ and BUS−. As mentioned above, each of the output signals may source equal but opposite currents in response to the binary input signal of one type and will not source any current in response to a binary signal of the other type. Also, similar to that mentioned in the context of FIG. 1B, multiple drivers 50 may also be used in parallel for each bus master with a corresponding bus of parallel pairs of leads.

Further, the driver circuit 50 of the present invention receives three additional inputs, P_REF, P_RES and P_VTERM. As will be explained in greater detail below, the P_REF and P_RES inputs are used to program the absolute value of the non-zero output current. Further, as will be explained in greater detail below, the P_VTERM signal is used to provide the value of the nominal termination voltage of the bus being driven. This value is used internally within the driver circuit to adjust and compensate itself for driving a bus of the desired termination voltage.

Figure 2B:
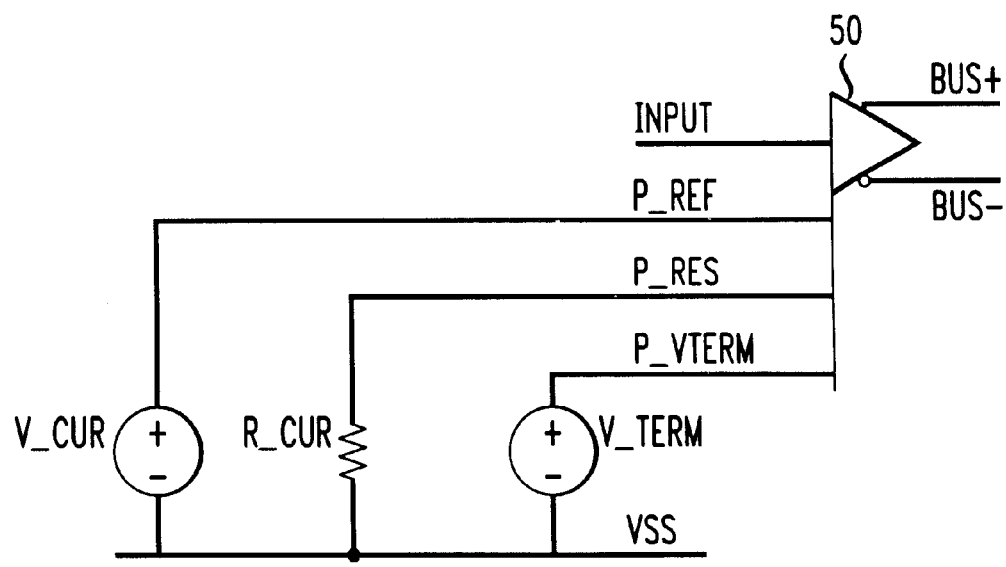
FIG. 2B is a schematic diagram illustrating circuitry that may be employed for programming the inputs to a driver circuit according to one embodiment of the present invention.

Referring now to FIG. 2B, a schematic diagram is shown illustrating circuitry that may be employed for programming the inputs to the driver circuit 50 of the present invention. Of course, other suitable programming circuitry may be employed. The voltage source labeled V_CUR provides a voltage reference for the driver circuit to use while measuring the current in the correspondingly externally supplied resistor labeled R_CUR in the programming circuit. As will be explained in greater detail below, the absolute value of the output current that will be used by the driver circuit will be the division of the current reference voltage by the value of the current reference resistor. Further, the driver circuit 50 is notified about the value of the nominal termination voltage of the bus that it will be driving by the application of a voltage on the P_VTERM input to the circuit. This is shown in FIG. 2B with the voltage source labeled V_TERM.

Details of the driver circuit design approach of the present invention and a preferred embodiment of the driver circuit 50 will now be provided in the context of descriptions associated with FIGS. 3 through 8.

1.2 Driver Circuit Design Approach

The driver design of the present invention is separated into two major parts. One part concerns itself with the generation of a stable and precise balanced current mirror. The second major part is the switching circuit itself. All previous $D^2L$ circuit designs merged these two aspects of a driver and the result was that all aspects of the circuit's performance (current balance, current value, and switching performance) suffered. The separation of the circuit into two major subcircuits provides a number of design advantages that are exploited in the new circuit to provide better performance.

One advantage of separating the driver into its two major parts is that the current generation part of the circuit can operate at relatively low speeds while only the switching parts must operate at the rated speed of the device. This is an enormous advantage in the design since the slow parts of the circuit can employ very large devices with their associated large capacitances while not affecting the speed timing performance of the high speed switching part of the circuit. This aspect of the design, as well as the general separation of the two major parts, is clearly illustrated in the circuit description discussed later. Each of these major subcircuits is briefly described next.

1.2.1 Output Current Generation

The first part of the circuit is responsible for generating two equal but opposite current sources that are matched as precisely with each other as possible. The exact value of the current is less important than the degree of matching between them due to the differential system that is targeted. Any mismatch in the two generated currents will give rise to a common mode signal component when the circuit is in the drive state. Although of lesser importance than precise matching of the two generated output currents, the absolute value of the non-zero output current has also proved to be somewhat problematic in previous designs. Both the matching of output currents and the absolute value of them are addressed in the new circuit. The detail of how this is done is described later in the section that provides the detailed circuit description.

An overview of the circuit approach used to overcome each of the output current generation problems in exiting $D^2L$ circuits is summarized in the following sections.

1.2.2 Output Current Absolute Value

In order to provide a more precise absolute value to the output currents (while the circuit is in the current drive state), user supplied current programming has been used. The user of the circuit supplies a voltage reference (e.g., V_CUR in FIG. 2B) and an external resistor (e.g., R_CUR in FIG. 2B) to program the driver circuit's output current absolute value. Since both the externally supplied resistor and voltage reference can be manufactured (or otherwise created, in the case of the reference voltage) to have a high immunity to value changes over the full temperature range of the system operation, the driver circuit only has to properly mirror the programmed current through to the output. All circuit techniques that contribute to a distortion of the proper reflection of the programmed current through to the outputs have been minimized.

1.2.3 Balanced Current Generation

To overcome the problems of generating precisely matching but opposite output currents, a fully symmetrical bridge circuit is used with active feedback. The active feedback creates a very close match between two generated currents, positive and negative. The bridge is composed of two current mirrors linked together. One mirror is on the top power rail (e.g., top current mirror shown in FIG. 6 comprised of transistors M400 and M402), the other is on the bottom rail (e.g., bottom current mirror shown in FIG. 6 comprised of transistors M401 and M403). Each leg of the bridge is actively forced, by means of the feedback, to carry the same amount of current. This ensures that the two output currents are very closely matched in their absolute values. The "Circuit Description" section below provides a more detailed description of the operation of this balanced bridge circuit.

1.2.4 Outputs Matched to the Bus Termination Voltage

All previous circuits generated mismatched positive and negative output currents as well as differing output current absolute values due to channel length modulation effects within the output transistors. The channel length modulation effects of the transistors served to create widely differing currents in the legs of the output current mirrors. This is because each of the transistors, forming a current mirror, sees a different drain-source ($V_{DS}$) voltage drop. These different voltage drops arose in previous circuits because they (the circuits) had to all but guess at the value of the bus termination voltage and try to arrange for all drain terminal voltages in the output current mirrors to be close to this voltage value. The circuit of the present invention overcomes this problem with the output bus termination voltage by simply having it supplied to the circuit directly through a separate input (e.g., via V_TERM in FIG. 2B). How the output transistor drain-source voltages are matched to the bus termination voltage is covered in the "Circuit Description" section below. It is to be appreciated that, in the description below, the bus termination voltage is a "nominal bus termination voltage," which is taken to be the mean or average value of the two termination voltages used on the bus leads. This is due to the fact that each of the two differential leads making up a single backplane bus signal are terminated at different voltages. Thus, in a preferred embodiment, there is no single bus termination voltage but rather what is referred to as a nominal bus termination voltage, as defined above.

1.3 Circuit Description

The driver circuit is divided into its two major parts. Each of these two major parts form almost independent subcircuits of the whole. Each of these subcircuits is further subdivided into circuit stages. The first major part of the circuit (generating matched output currents) is shown in FIGS. 3 through 6. The second major part of the circuit (the switching part) is shown in FIGS. 7 and 8. Other portions of the circuit such as input and output pin protection are not shown for clarity. These circuit portions are considered out of the scope of the present invention and one of ordinary skill in the art will appreciate their inclusion and operation. Further, it is to be appreciated that the following schematic convention is employed with respect to the MOSFETs illustrated in the figures. All MOSFETs are illustrated with a gate terminal (G), a drain terminal (D), a source terminal (S) and a substrate terminal (not labeled with a letter in the figures that include transistors). A P-channel MOSFET has an arrow on its substrate terminal facing away from its gate terminal, while an N-channel MOSFET has an arrow on its substrate terminal facing towards its gate terminal. Also, the substrate terminals of the P-channel MOSFETs are connected to the most positive power voltage (VDD), while the substrate terminals of the N-channel MOSFETs are connected to the most negative power voltage (VEE). Other connections of the substrate terminals for the P-channel or N-channel transistors are possible (but usually only one or the other type of channel device and not both) depending on the integrated circuit technology that the transistors are implemented in. Other connections of the transistor substrate terminals are possible in the present invention but are not discussed further herein.

1.3.1 Current Generation

This subsection describes the current generation subcircuit of the driver of the invention in detail. The operation of each of the elements in the stages of this subcircuit will be given along with the interactions between elements and other circuit stages. The current generation subcircuit is responsible for generating a programmable output current that is matched to the programmable input. A responsibility of the subcircuit is also to arrange that the two output current polarities are matched to each other and do not vary significantly as a result of changes in the nominal bus terminal voltage. These two goals are, in part, achieved by the use of three additional inputs to the circuit (apart from the switching input signal). Two of these inputs serve to program the absolute value of the output current, while the third input signal provides the nominal bus termination voltage that is used internally to provide balanced output currents. This subcircuit is divided into four stages that are each explained below.

Figure 3:
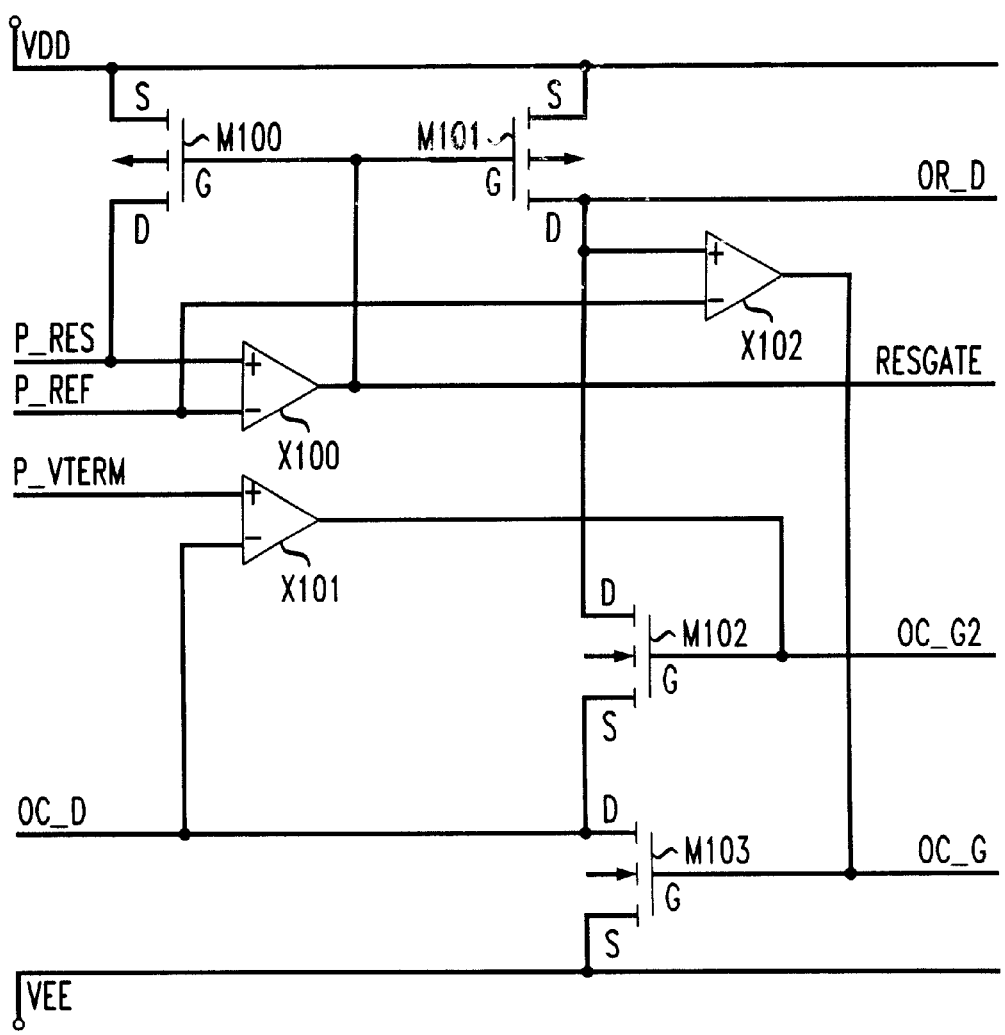
FIG. 3 is a schematic diagram illustrating a first stage of a current generation portion of a driver circuit according to one embodiment of the present invention.

Referring now to FIG. 3, a schematic diagram is shown illustrating a first stage of a current generation portion of a driver circuit according to one embodiment of the present invention. The user programs the output current absolute value by providing an external resistor (e.g., as shown in FIG. 2B) connected to the signal P_RES, shown on the left side of FIG. 3. The user must also supply a reference voltage and this is done by connecting the desired reference voltage (e.g., as shown in FIG. 2B) to signal P_REF, also on the left side of FIG. 3. The circuit provides current for the externally supplied resistor through transistor M100. The operational amplifier (hereafter OPAMP) X100 is used to compare the voltage across the external resistor (and therefore the internally supplied current) with the externally provided voltage source. The output of the OPAMP is used in a feedback circuit with transistor M100 to close the feedback loop. The output of transistor M101 is now pretty well matched to the user programmed current. These transistors form a familiar current mirror. Their currents are, however, only precisely matched through the use of a second feedback system. Since their drain voltages may be different, their currents may be different.

The second feedback system ensures that the drain voltages of transistors M100 and M101 are the same. This second feedback loop is made up of transistors M102, M103 and OPAMP X102. The operation of transistor M102 is not directly affected by the operation of this second feedback loop but the current through it is in series with the loop operation. OPAMP X102 adjusts the operation of transistor M103 until the drain voltages on transistors M100 and M101 are precisely matched.

A third feedback loop, composed of OPAMP X101 and transistor M102, ensures that the drain of transistor M103 is matched to the bus termination voltage. The bus termination value is provided on signal P_VTERM and, like P_REF, may be user specified (e.g., as shown in FIG. 2B). This is important later since transistor M103 forms part of the current mirror to bring the programmed current to the outputs.

Figure 4:
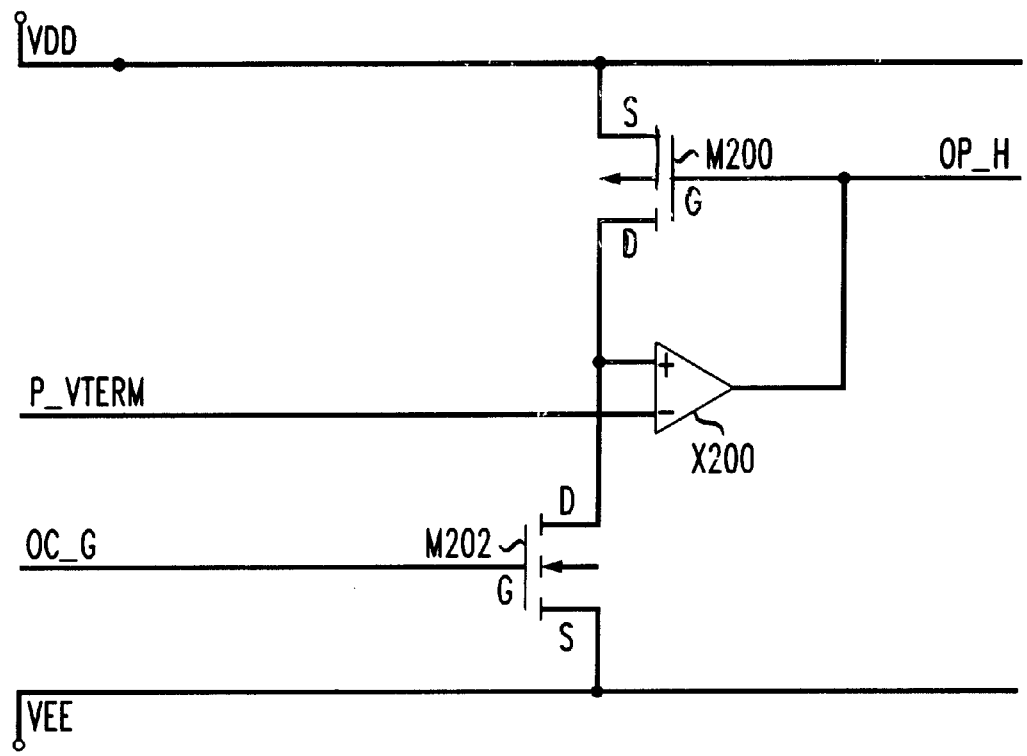
FIG. 4 is a schematic diagram illustrating a second stage of a current generation portion of a driver circuit according to one embodiment of the present invention.

Referring now to FIG. 4, a schematic diagram is shown illustrating a second stage of a current generation portion of a driver circuit according to one embodiment of the present invention. That is, the next stage of the current generation subcircuit is shown in FIG. 4. This stage of the circuit is responsible for flipping the current that we have in MOSFET M103 from the previous stage up to the top rail. This must be done while keeping the drain voltage on MOSFET M202 of this stage at the nominal bus termination voltage. This is accomplished with the feedback loop formed by OPAMP X200 and MOSFET M200. One of the inputs to OPAMP X200 is the nominal bus termination voltage (on signal P_VETRM) and the other input is the drain of both MOSFETs M200 and M202. It is also important, and intentional, that the drain of MOSFET M200 also be at the bus termination voltage because this MOSFET forms part of the current mirror in the final current generation stage. Since the drains of all final stage transistors are near the bus termination voltage, the drain of MOSFET M200 also had to be at that voltage for matching purposes. Finally, signal OP_H, which is the gate of MOSFET M200, is fed to the final output current generation stage to complete the output stage current mirroring.

Figure 5:
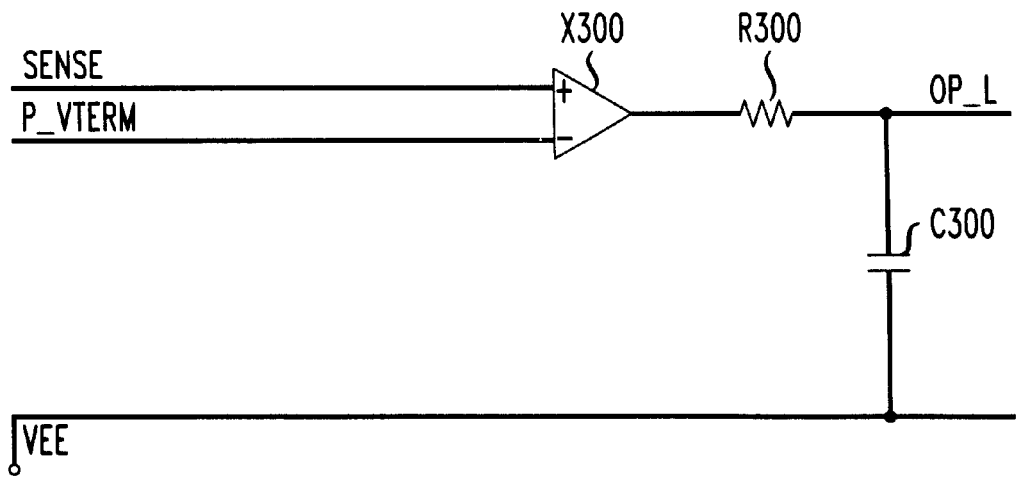
FIG. 5 is a schematic diagram illustrating a third stage of a current generation portion of a driver circuit according to one embodiment of the present invention.

Referring now to FIG. 5, a schematic diagram is shown illustrating a third stage of a current generation portion of a driver circuit according to one embodiment of the present invention. This stage is responsible for the balance in the complementary output currents in the final stage of the current generation subcircuit. This is a simple circuit stage and only comprises one OPAMP X300 and the resistor-capacitor (R300-C300) voltage filter circuit. The inputs to the OPAMP are the user programmed value of the bus termination voltage and the approximate drain voltages of transistors M400 and M401 in the output current bridge circuit shown in FIG. 6. The user supplied bus termination value is provided on signal P_VTERM, again in FIG. 5, and the output bridge circuit drain voltages are provided on signal SENSE from the final stage of FIG. 6. The OPAMP compares these signal voltages and drives the resistor-capacitor filter accordingly. The resistor-capacitor filter is provided for compensation of the feedback loop formed by this OPAMP. Without this compensation, the output bridge circuit control loop would be unstable. The output of the filter is provided on signal OP_L and drives the transistor gates of the output bridge circuit bottom rail transistors (M401 and M403) of FIG. 6. This stage of the circuit is best understood when viewed as part of the final stage of the current generation subcircuit explained in the context of FIG. 6.

Figure 6:
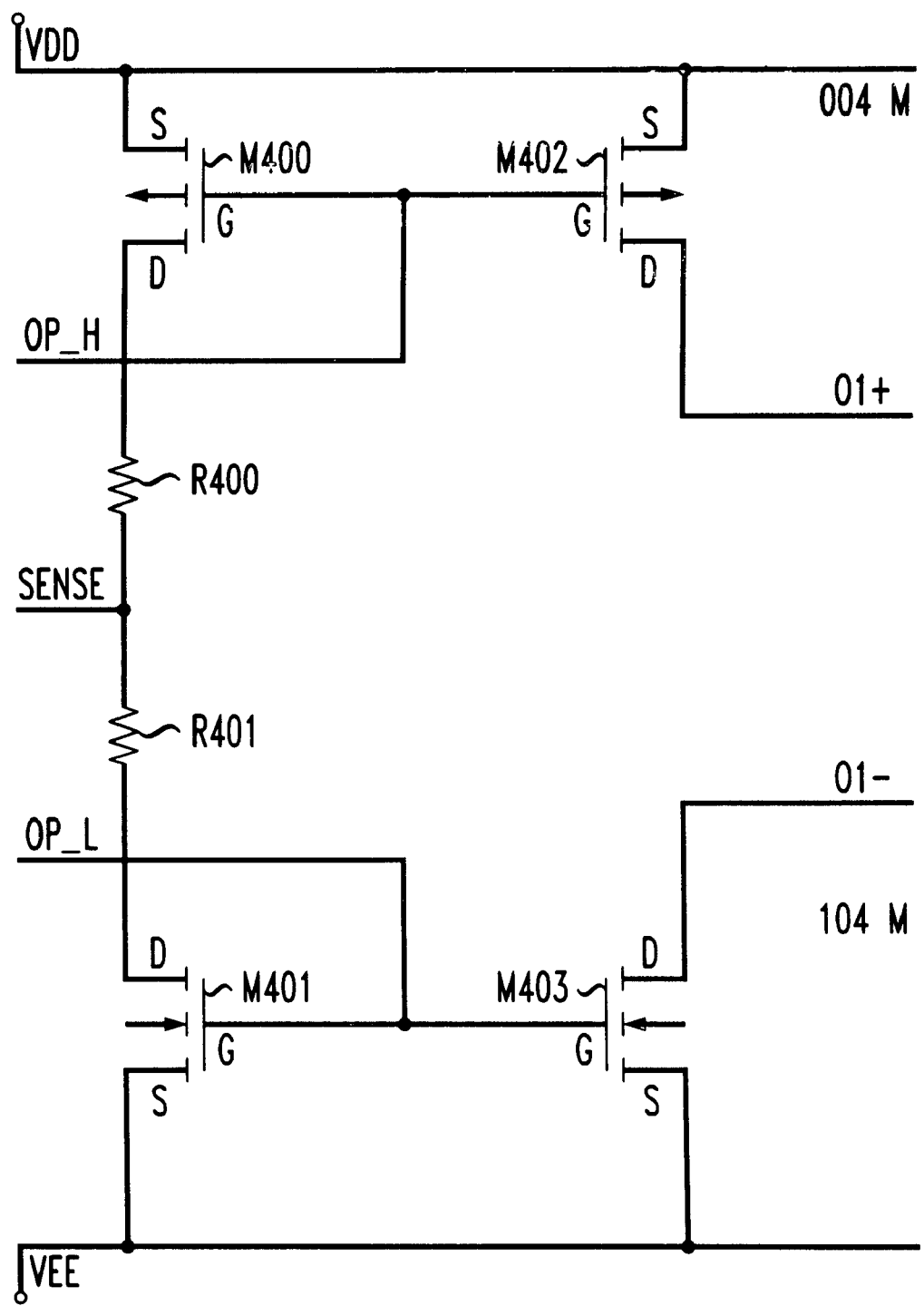
FIG. 6 is a schematic diagram illustrating a final stage of a current generation portion of a driver circuit according to one embodiment of the present invention.

Referring now to FIG. 6, a schematic diagram is shown illustrating a final stage of a current generation portion of a driver circuit according to one embodiment of the present invention. The circuit of FIG. 6 is the final stage of the current generation subcircuit of the driver. Depicted is the balanced bridge circuit that is used to create the complementary output currents. The output currents are those that come off of the drains of transistors M402 and M403, respectively, the positive current from the top transistor and the negative current from the bottom one. The two currents, on signals O1+ and O1− proceed on to the last stage of the switching subcircuit of the driver, explained below in the context of FIG. 8.

Since the drain of M403 is nominally at the bus termination voltage, by definition, since it goes on through the last stage of the switching subcircuit to connect to the bus, it is desirable to have the drain voltage of its matching transistor M401 also to be at the same voltage; namely, the bus termination voltage. Signal OP_L, which drives the gates of transistors M401 and M403, comes from the previous stage shown in FIG. 5. The SENSE signal, shown between resistors R400 and R401, along with the previous stage (FIG. 5), forms a feedback control loop with transistor M401. This control loop ensures that the drain of M401 closely matches the bus termination voltage given by signal P_VTERM. This was done by the action of the OPAMP in the previous stage (FIG. 5) by comparing the SENSE signal here to the P_VTERM signal (carrying the bus termination voltage) and thus forcing them to be the same value.

Although the control loop described for this stage does not include transistor M400 directly, it is an important part of the operation of the entire bridge. Since transistor M400 supplies the only current to the drain of M401, these two transistors have almost identical current through them, save any tiny leakage output through signal SENSE. Since the OPAMP of the previous stage (FIG. 5) draws very little current from the SENSE signal, the leakage current escaping the drain of M401 and coming from the drain of M400 is, indeed, very small and essentially negligible in the context of this circuit. Since the drain voltage of M402 is also at the nominal bus termination voltage, in like manner to M403, and the drain voltage of M400 is close to that of SENSE (itself forced to be close to the bus termination voltage as discussed already), these two top transistors form an excellent current mirror also since they share the same gate voltage. The gate voltage for the top two transistors is supplied on signal OP_H and originates from the output current generation subcircuit (stage 2) already explained above in the context of FIG. 4.

It can now be seen that all four of these output stage transistors share almost the same drain voltages and that transistors M400 and M401 share almost the identical current through them. This whole subcircuit is therefore a balanced bridge circuit forcing the two output transistors M402 and M403 to also have nearly identical, but opposite output currents. This whole bridge circuit is actively maintained by a control loop and this yields the excellent output current compensation for differing bus termination voltages and the excellent matching of the two complementary output currents to each other.

Accordingly, as explained above, the invention uses the nominal bus termination voltage to match the drain voltages of transistors M400 and M401 to the nominal voltages on the bus (which are roughly the same as the drain voltages on transistors M402 and M403). The effect of this is to create better current mirrors for the outputs thereby providing a more ideal absolute output current (on both outputs) than if internal compensation was not done using the information about the expected nominal bus termination voltage.

1.3.2 Switching The second major part of the driver circuit of the invention performs the switching functions of the circuit. This part of the circuit comprises three main stages. The first and second stages are shown in FIGS. 7A and 7B while the third stage is shown in FIG. 8.

Figure 7A:
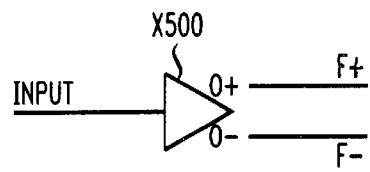
FIGS. 7A and 7B are schematic diagrams respectively illustrating first and second stages of a switching portion of a driver circuit according to one embodiment of the present invention.
Figure 7B:
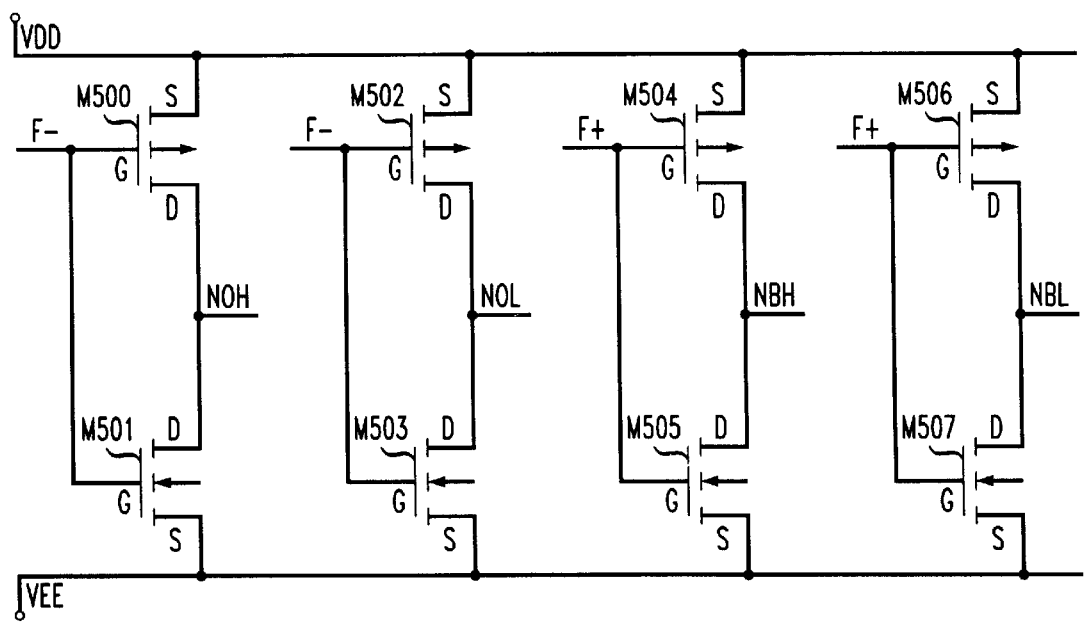
Figure 8:
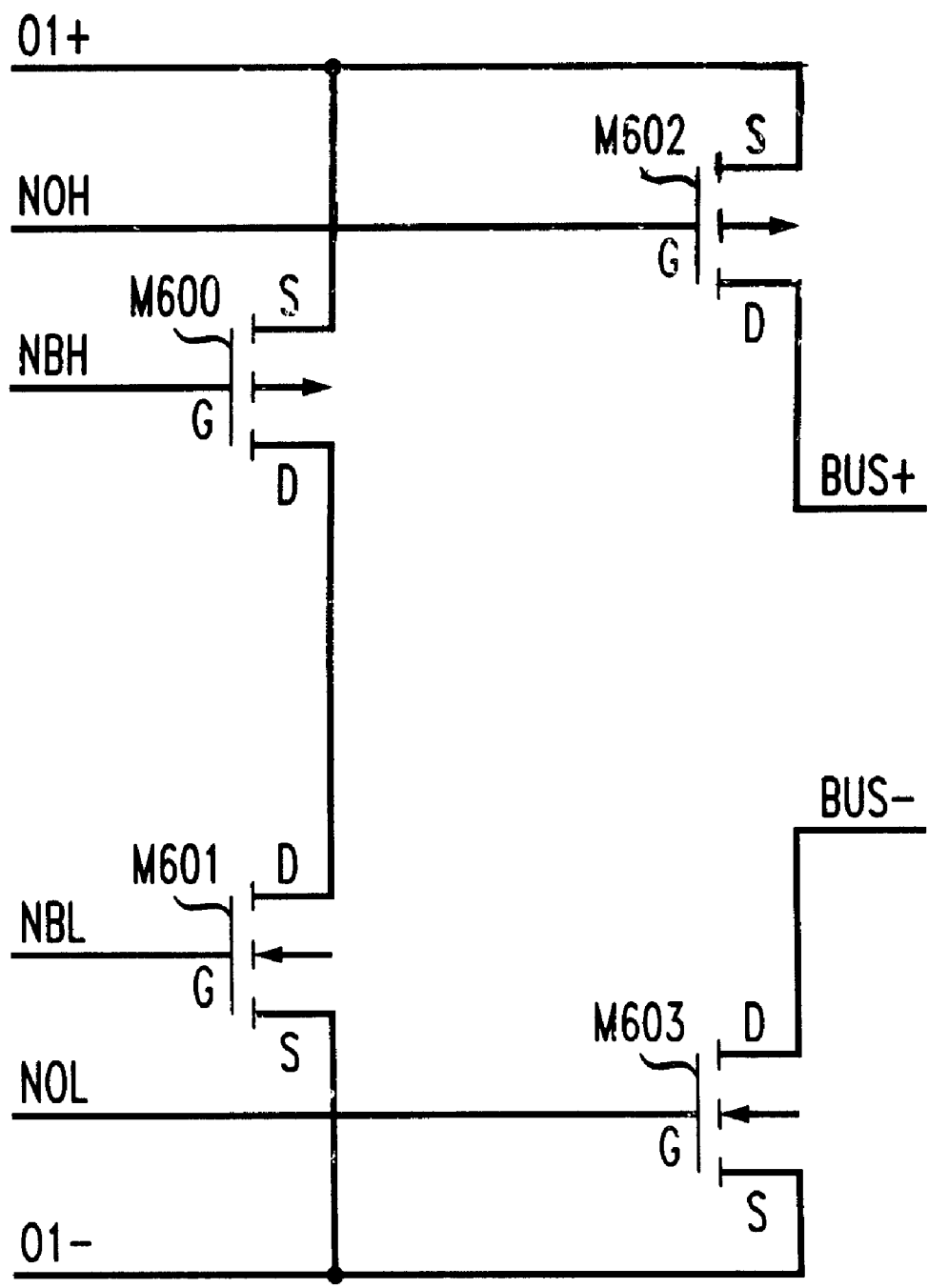
FIG. 8 is a schematic diagram illustrating a final stage of a switching portion of a driver circuit according to one embodiment of the present invention.

Referring now to FIGS. 7A and 7B, schematic diagrams are shown respectively illustrating first and second stages of a switching portion of a driver circuit according to one embodiment of the present invention. The circuit X500 in FIG. 7A forms the first stage of the switching part of the driver. This circuit provides the conversion of the INPUT signal from a CMOS level signal to two differential CMOS signals. This circuit is not described in detail since this is a standard function, well known to those skilled in the art. However, it is important to note that the circuit used to perform the conversion should maintain as little skew between the two output signals as possible. As previously mentioned, INPUT is the primary binary signal input to the driver circuit of the invention. This input is a CMOS level signal and only has two states, either a high voltage (corresponding to the current drive state of the circuit outputs) and a low voltage (corresponding to zero current drive on the circuit outputs). In a preferred embodiment, the driver circuit of the invention is powered by a 3.3V (volt) power supply. Therefore, the input signal on INPUT would swing between approximately 0 V and 3.3V representing a logic '0' and a logic '1' state, respectively.

The second stage of the switching part of the driver is shown in FIG. 7B. This part of the circuit takes as its input the two differential CMOS signals already produced by the previous stage (signals F+ and F−). These two signals are used to create the four signals that are used to drive the output driver switching transistors. Four simple inverter type circuits are used for this purpose, but each of these inverters is specifically tuned for its corresponding output transistor. As shown, transistor pair M500 and M501 generates signal NOH from signal F−; transistor pair M502 and M503 generates signal NOL from signal F−; transistor pair M504 and M505 generates signal NBH from signal F+; and transistor pair M506 and M507 generates signal NBL from signal F+.

The idea of tuning mentioned above refers to the fact that the transistor gate widths (and possibly the gate lengths) of each of the transistors of FIG. 7B are adjusted to match the current drive requirements (maybe different for driving high and low respectively) of the output switching transistors (FIG. 8) that each inverter drives. This is often referred to as transistor "sizing" in the art. The transistors being driven by these four inverters (of FIG. 7B) are located in FIG. 8, which will be described below. Each of the four inverters drives one of the four transistors (M600 through M603) of FIG. 8. Since the operating characteristics of the transistors of FIG. 8 may all be different from each other, each transistor has a different amount of stored charge on their internal capacitors between gate and source. The goal of the whole circuit is to have both output transistors (M602 and M603) switch identically in time and to have the bypass current path (represented by transistors M600 and M601) also be phased in time so as to create a nice clean square signal on the output during a switch. The amount of possible charge stored in the gate-source capacitors of all output switching transistors must be sourced or removed by the inverters of FIG. 7B in roughly the same amount of time. This requires different current drive capability from each of the four inverters to be matched to that required for the transistor it is driving. Therefore, the transistors in each of the four inverters of FIG. 7B are "sized" to provide the optimum current output.

In general, larger gate widths increase the current drive ability of a transistor almost linearly with the gate width. Longer gate lengths decrease the transistor drive ability but reduce the effects of channel length modulation. Reducing channel length modulation is desirable in certain circumstances where one can tolerate the otherwise slower timing performance and lower drive capability. Of course, having the smallest sized transistors in general is desirable for reducing overall silicon area, but that is not a primary consideration in this circuit. It is also to be appreciated that the four inverters of FIG. 7B could also be reduced to two (complimentary) inverters where individual sizing suited to each of the four output switching transistors is either not required or otherwise not desirable for any other reason.

Referring now to FIG. 8, a schematic diagram is shown illustrating a final stage of a switching portion of a driver circuit according to one embodiment of the present invention. This last part of the circuit contains the output driver transistors forming the two $D^2L$ output signals to the external bus. The matched currents used in the drive state of the circuit are provided through signals O1+ and O1− which were generated in a previous stage. The transistors used to switch the matched currents to the output are M602 and M603. Transistors M600 and M601 are used in the non-drive state of the driver to shunt the matched reference currents to each other to cancel them out. These current bypass transistors are critical to correct operation at high speeds since currents will dramatically reflect back through the circuit if not properly absorbed (terminated).

2. Exemplary Benefits

The differential signal driver circuit of the present invention provides many benefits over previous circuits. The following benefits are some examples:

(i) The ability to program the output current absolute value through an externally supplied resistor and current reference voltage dramatically improves the stability of the output current values compared with all previous designs. This improvement is also largely independent of temperature and processing variances in the IC.

(ii) The output currents are very closely matched to each other over the full range of temperature and processing of the IC.

(iii) The output currents are also well matched to the given bus termination voltage since the termination voltage is supplied to the circuit as a reference.

(iv) The new circuit employs only CMOS transistors thus providing the best possible cost metric for any $D^2L$ driver to date.

These benefits allow for greater utility of the circuit as well as more applications due to its lower cost.

Accordingly, as explained in detail herein, an improved differential current driver circuit of the invention provides a means to program the bus termination voltage and the output nonzero absolute current value into the driver. This information is used by the driver circuit to closely match the internal elements of the circuit so as to produce very stable (over temperature and IC processing) output currents. The improved circuit also employs many active feedback mechanisms to ensure a close match of the two complementary output currents. This may be done using a novel balanced bridge circuit in the output stage of the current generation part of the driver. Since this driver circuit is designed in a standard all-CMOS process, it enjoys the low cost benefit of that process technology. This circuit exceeds all electrical and timing performance metrics of all previous $D^2L$ circuits due to the innovations it has used.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A differential current driver circuit for use in driving signals on a bus, the differential current driver circuit comprising:

a current generation stage, the current generation stage providing two current sources, the two current sources respectively generating a first current signal and a second current signal, the first and second current signals being substantially equal in magnitude and opposite in polarity; and a current switching stage, the current switching stage being functionally separate from and coupled to the current generation stage and switching the first and second current signals generated in the current generation stage between a first differential output state and a second differential output state in response to an input binary signal;

wherein a voltage is provided to the current generation circuit so that the first and second current signals are generated for operation on the bus in accordance with a nominal bus termination voltage associated therewith.

2. The circuit of claim 1, wherein active components of the current generation stage and the current switching stage are predominantly complementary metal oxide semiconductor components.

3. The circuit of claim 1, wherein the current generation stage operates at a lower speed than the current switching stage.

4. The circuit of claim 1, wherein the magnitudes of the first and second current signals are programmable.

5. The circuit of claim 1, wherein the current generation stage comprises:

a symmetrical bridge subcircuit for balanced generation of the first and second current signals; and one or more active feedback subcircuits, coupled to the symmetrical bridge subcircuit, for setting the absolute values of the first and second current signals and ensuring that the first and second current signals are generated with respect to a bus termination voltage associated with the bus.

6. The circuit of claim 5, wherein the absolute value of the first and second current signal is determined by an externally provided resistor coupled to one of the active feedback subcircuits.

7. The circuit of claim 5, wherein the bus termination voltage is determined by an externally provided voltage source coupled to one of the active feedback subcircuits.

8. The circuit of claim 1, wherein the current switching stage comprises:

a first subcircuit for converting the input binary signal to a pair of differential signals;

a second subcircuit, coupled to the first subcircuit, for generating at least a pair of differential output driver signals from the pair of differential signals generated by the first subcircuit, the pair of differential output driver signals being tuned to drive a third subcircuit; and the third subcircuit, coupled to the second subcircuit, for switching the first and second current signals generated in the current generation stage between the first differential output state and the second differential output state in response to the pair of differential output driver signals.

9. The circuit of claim 1, wherein the current generation stage and the current switching stage are implemented in an integrated circuit.

10. A differential current driver circuit for use in driving signals on a bus, the differential current driver circuit comprising:

a current generation stage, the current generation stage providing two current sources, the two current sources respectively generating a first current signal and a second current signal, the first and second current signals being substantially equal in magnitude and opposite in polarity; and a current switching stage, the current switching stage being coupled to the current generation stage and switching the first and second current signals generated in the current generation stage between a first differential output state and a second differential output state in response to an input binary signal, wherein active components of the current generation stage and the current switching stage are predominantly complementary metal oxide semiconductor components;

wherein a voltage is provided to the current generation circuit so that the first and second current signals are generated for operation on the bus in accordance with a nominal bus termination voltage associated therewith.

11. The circuit of claim 10, wherein the current generation stage operates at a lower speed than the current switching stage.

12. The circuit of claim 10, wherein the magnitudes of the first and second current signals are programmable.

13. The circuit of claim 10, wherein the current generation stage comprises:

a symmetrical bridge subcircuit for balanced generation of the first and second current signals; and one or more active feedback subcircuits, coupled to the symmetrical bridge subcircuit, for setting the absolute values of the first and second current signals and ensuring that the first and second current signals are generated with respect to a bus termination voltage associated with the bus.

14. The circuit of claim 13, wherein the absolute value of the first and second current signal is determined by an externally provided resistor coupled to one of the active feedback subcircuits.

15. The circuit of claim 13, wherein the bus termination voltage is determined by an externally provided voltage source coupled to one of the active feedback subcircuits.

16. The circuit of claim 10, wherein the current switching stage comprises:

a first subcircuit for converting the input binary signal to a pair of differential signals;

a second subcircuit, coupled to the first subcircuit, for generating at least a pair of differential output driver signals from the pair of differential signals generated by the first subcircuit, the pair of differential output driver signals being tuned to drive a third subcircuit; and the third subcircuit, coupled to the second subcircuit, for switching the first and second current signals generated in the current generation stage between the first differential output state and the second differential output state in response to the pair of differential output driver signals.

17. The circuit of claim 10, wherein the current generation stage and the current switching stage are implemented in an integrated circuit.

18. A differential current driver circuit for use in driving signals on a bus, the differential current driver circuit comprising:

a current generation stage, the current generation stage providing two current sources, the two current sources respectively generating a first current signal and a second current signal, the first and second current signals being substantially equal in magnitude and opposite in polarity, wherein the magnitudes of the first and second current signals are programmable; and a current switching stage, the current switching stage being coupled to the current generation stage and switching the first and second current signals generated in the current generation stage between a first differential output state and a second differential output state in response to an input binary signal;

wherein a voltage is provided to the current generation circuit so that the first and second current signals are generated for operation on the bus in accordance with a nominal bus termination voltage associated therewith.

19. The circuit of claim 18, wherein the current generation stage is responsive to an input signal provided thereto to achieve programmed magnitudes of the first and second current signals.

20. The circuit of claim 18, wherein active components of the current generation stage and the current switching stage are predominantly complementary metal oxide semiconductor components.

21. The circuit of claim 18, wherein the current generation stage operates at a lower speed than the current switching stage.

22. The circuit of claim 18, wherein the current generation stage comprises:
   a symmetrical bridge subcircuit for balanced generation of the first and second current signals; and
   one or more active feedback subcircuits, coupled to the symmetrical bridge subcircuit, for setting the absolute values of the first and second current signals and ensuring that the first and second current signals are generated with respect to a bus termination voltage associated with the bus.

23. The circuit of claim 22, wherein the absolute value of the first and second current signal is determined by an externally provided resistor coupled to one of the active feedback subcircuits.

24. The circuit of claim 22, wherein the bus termination voltage is determined by an externally provided voltage source coupled to one of the active feedback subcircuits.

25. The circuit of claim 18, wherein the current switching stage comprises:
   a first subcircuit for converting the input binary signal to a pair of differential signals;
   a second subcircuit, coupled to the first subcircuit, for generating at least a pair of differential output driver signals from the pair of differential signals generated by the first subcircuit the pair of differential output driver signals being tuned to drive a third subcircuit; and
   the third subcircuit, coupled to the second subcircuit, for switching the first and second current signals generated in the current generation stage between the first differential output state and the second differential output state in response to the pair of differential output driver signals.

26. The circuit of claim 18, wherein the current generation stage and the current switching stage are implemented in an integrated circuit.

27. A differential current driver circuit for use in driving signals on a backplane bus, the differential current driver circuit comprising:
   a current generation stage, the current generation stage providing two current sources, the two current sources respectively generating a first current signal and a second current signal, the first and second current signals being substantially equal in magnitude and opposite in polarity, the current generation stage having active feedback control for setting the absolute values of the first and second current signals; and
   a current switching stage, the current switching stage being coupled to the current generation stage and switching the first and second current signals generated in the current generation stage between a first differential output state and a second differential output state in response to an input binary signal.

28. The circuit of claim 27, wherein active components of the current generation stage and the current switching stage are predominantly complementary metal oxide semiconductor components.

29. The circuit of claim 27, wherein the current generation stage operates at a lower speed than the current switching stage.

30. The circuit of claim 27, wherein the current generation stage and the current switching stage are implemented in an integrated circuit.

31. A differential current driver circuit for use in driving signals on a backplane bus, the differential current driver circuit comprising:
   a current generation stage, the current generation stage providing two current sources, the two current sources respectively generating a first current signal and a second current signal, the first and second current signals being substantially equal in magnitude and opposite in polarity, the current generation stage having active feedback control, responsive to an input voltage, for ensuring that the first and second current signals are substantially optimally generated with respect to a bus termination voltage associated with the backplane bus; and
   a current switching stage, the current switching stage being coupled to the current generation stage and switching the first and second current signals generated in the current generation stage between a first differential output state and a second differential output state in response to an input binary signal.

32. The circuit of claim 31, wherein active components of the current generation stage and the current switching stage are predominantly complementary metal oxide semiconductor components.

33. The circuit of claim 31, wherein the current generation stage operates at a lower speed than the current switching stage.

34. The circuit of claim 31, wherein the current generation stage and the current switching stage are implemented in an integrated circuit.

35. A differential current driver circuit for use in driving signals on a bus, the differential current driver circuit comprising:
   a current generation stage, the current generation stage providing two current sources, the two current sources respectively generating a first current signal and a second current signal, the first and second current signals being substantially equal in magnitude and opposite in polarity; and
   a current switching stage, the current switching stage being substantially functionally separate from and coupled to the current generation stage and switching the first and second current signals generated in the current generation stage between a first differential output state and a second differential output state in response to an input binary signal;
   wherein the current generation stage comprises:
      a symmetrical bridge subcircuit for balanced generation of the first and second current signals; and
      one or more active feedback subcircuits, coupled to the symmetrical bridge subcircuit, for setting the absolute values of the first and second current signals and ensuring that the first and second current signals are substantially optimally generated with respect to a bus termination voltage associated with the bus.

36. The circuit of claim 35, wherein the absolute value of the first and second current signal is determined by an externally provided resistor coupled to one of the active feedback subcircuits.

37. The circuit of claim 35, wherein the bus termination voltage is determined by an externally provided voltage source coupled to one of the active feedback subcircuits.

38. A differential current driver circuit for use in driving signals on a bus, the differential current driver circuit comprising:

a current generation stage, the current generation stage providing two current sources, the two current sources respectively generating a first current signal and a second current signal, the first and second current signals being substantially equal in magnitude and opposite in polarity; and a current switching stage, the current switching stage being coupled to the current generation stage and switching the first and second current signals generated in the current generation stage between a first differential output state and a second differential output state in response to an input binary signal, wherein active components of the current generation stage and the current switching stage are predominantly complementary metal oxide semiconductor components;

wherein the current generation stage comprises:
      a symmetrical bridge subcircuit for balanced generation of the first and second current signals; and
      one or more active feedback subcircuits, coupled to the symmetrical bridge subcircuit, for setting the absolute values of the first and second current signals and ensuring that the first and second current signals are substantially optimally generated with respect to a bus termination voltage associated with the bus.

39. The circuit of claim 38, wherein the absolute value of the first and second current signal is determined by an externally provided resistor coupled to one of the active feedback subcircuits.

40. The circuit of claim 38, wherein the bus termination voltage is determined by an externally provided voltage source coupled to one of the active feedback subcircuits.

41. A differential current driver circuit for use in driving signals on a bus, the differential current driver circuit comprising:

a current generation stage, the current generation stage providing two current sources, the two current sources respectively generating a first current signal and a second current signal, the first and second current signals being substantially equal in magnitude and opposite in polarity, wherein the magnitudes of the first and second current signals are programmable; and a current switching stage, the current switching stage being coupled to the current generation stage and switching the first and second current signals generated in the current generation stage between a first differential output state and a second differential output state in response to an input binary signal;

wherein the current generation stage comprises:
      a symmetrical bridge subcircuit for balanced generation of the first and second current signals; and
      one or more active feedback subcircuits, coupled to the symmetrical bridge subcircuit, for setting the absolute values of the first and second current signals and ensuring that the first and second current signals are substantially optimally generated with respect to a bus termination voltage associated with the bus.

42. The circuit of claim 41, wherein the absolute value of the first and second current signal is determined by an externally provided resistor coupled to one of the active feedback subcircuits.

43. The circuit of claim 41, wherein the bus termination voltage is determined by an externally provided voltage source coupled to one of the active feedback subcircuits.

* * * * *